(12) United States Patent
Choi et al.

(10) Patent No.: US 7,408,955 B2
(45) Date of Patent: Aug. 5, 2008

(54) GIGABIT ETHERNET PASSIVE OPTICAL NETWORK SYSTEM AND MEDIA ACCESS CONTROL METHOD FOR THE SAME

(75) Inventors: Do-In Choi, Seoul (KR); Yun-Je Oh, Suwon-shi (KR); Min-Hyo Lee, Suwon-shi (KR); Soon-Ho Jang, Songnam-shi (KR); Hwan-Jin Sung, Suwon-shi (KR); Tae-Sung Park, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1009 days.

(21) Appl. No.: 10/278,305

(22) Filed: Oct. 23, 2002

(65) Prior Publication Data
US 2003/0091045 A1  May 15, 2003

(30) Foreign Application Priority Data
Nov. 10, 2001  (KR) ............................... 2001-69987

(51) Int. Cl.
*H04J 3/16* (2006.01)
*H04J 3/26* (2006.01)
*H04J 3/24* (2006.01)
*H04J 14/08* (2006.01)

(52) U.S. Cl. .................. 370/468; 370/432; 370/473; 370/442; 398/99

(58) Field of Classification Search .............. 370/473, 370/474, 395.4, 235, 445, 443, 395.41, 449, 370/468, 458; 359/135, 136, 138
See application file for complete search history.

(56) References Cited

U.S. PATENT DOCUMENTS

| | | | | |
|---|---|---|---|---|
| 5,978,374 A * | 11/1999 | Ghaibeh et al. | ......... | 370/395.43 |
| 6,546,014 B1 * | 4/2003 | Kramer et al. | ......... | 370/395.41 |
| 6,658,009 B1 * | 12/2003 | Yamashita et al. | ..... | 370/395.65 |
| 6,778,550 B1 * | 8/2004 | Blahut | ......... | 370/443 |
| 7,031,343 B1 * | 4/2006 | Kuo et al. | ......... | 370/473 |

FOREIGN PATENT DOCUMENTS

| | | |
|---|---|---|
| JP | 2000-092011 | 3/2000 |
| WO | WO 98/32307 | 7/1998 |
| WO | WO 02/056482 A2 | 7/2002 |

* cited by examiner

*Primary Examiner*—Hanh Nguyen
(74) *Attorney, Agent, or Firm*—Cha & Reiter, LLC

(57) ABSTRACT

A GE-PON (Gigabit Ethernet Passive Optical Network) system and media access control method for the same are disclosed. In the GE-PON system, by employing MAC attributes of the gigabit Ethernet frames, an OLT (Optical Line Termination) transmits a downstream window containing both a control frame having timeslot position and size information in association with at least two ONUs and Ethernet frames to an ODN (Optical Distribution Network). The OLT analyzes contents of RAUs in an upstream window transmitted from the ONUs in a TDMA method and received from the ODN, and permits timeslot position and size corresponding to each of the ONUs. A plurality of ONUs, connected to the ODN, have their respective timeslot position and size allocated in response to their respective information contained in the control frame of the downstream window. RAU frames are transmitted having queue information and Ethernet frames associated with the allocated timeslots. As a result, by the above MAC structure of the GE-PON system, the OLT can be quickly intercommunicated with a plurality of ONUs.

12 Claims, 9 Drawing Sheets

FIG.3

| ADDITION BY TRANSMITTER, REMOVAL BY RECEIVER | | PACKET | | | | | ADDITION BY TRANSMITTER |
|---|---|---|---|---|---|---|---|
| | | DATA FRAME (USER'S TRANSMISSION) | | | | | |
| | | DATA FRAME | | | | | |
| PREAMBLE | S F D | TARGET ADDRESS | SOURCE ADDRESS | LDF /TYP | LLC DATA | PAD | CRC |
| 7-BYTES | 1 | 6-BYTES | 6-BYTES | 2 | 0~1500 | 0~46 | 4-BYTES |
| | | | | HIGH-LOW | ... | ... | MSB ... LSB |

GIGABIT ETHERNET PASSIVE OPTICAL NETWORK SYSTEM AND MEDIA ACCESS CONTROL METHOD FOR THE SAME

CLAIM OF PRIORITY

This application makes reference to and claims all benefits accruing under 35 U.S.C. Section 119 from an application entitled, "GIGABIT ETHERNET PASSIVE OPTICAL NETWORK SYSTEM AND MEDIA ACCESS CONTROL METHOD FOR THE SAME", filed in the Korean Industrial Property Office on Nov. 10, 2001 and there duly assigned Serial No. 2001-69987.

BACKGROUND OF THE INVENTION

1. Field of the Invention

The present invention relates to a PON (Passive Optical Network) system, and more particularly to a GE-PON (Gigabit Ethernet frame Passive Optical Network) system and a MAC (Media Access Control) method for the same.

2. Description of the Related Art

PON systems typically are configured to have a passive distributor or a WDM (Wave Division Multiplexing) element deployed between a subscriber access node, such as a FTTH (Fiber To The Home) or FTTC (Fiber To The Curb), and a NT (Network Termination) node. In this type of configuration, all the nodes are distributed in a bus or tree structure, thereby forming an overall topology. A typical PON system, known as an ATM (Asynchronous Transfer Mode)-PON, is well known in the art, and its MAC technique are described in detail in the ITU-T (International Telecommunication Union-T) G.983.1.

The MAC protocols used in the conventional ATM PON system are described in U.S. Pat. No. 5,978,374 issued on Nov. 2, 1999, entitled "PROTOCOL FOR DATA COMMUNICATION OVER A POINT-TO-MULTIPOINT PASSIVE OPTICAL NETWORK", and in Korean Patent Laid-open No. 1999-70901 published on Sep. 15, 1999, entitled "METHOD FOR IMPLEMENTING ASYNCHRONOUS PASSIVE OPTICAL NETWORK MEDIA ACCESS CONTROL PROTOCOL", which are incorporated herein by reference. Briefly, the MAC of the ATM-PON system will hereinafter be described.

FIGS. 1a~1b illustrate a block diagram of the ATM-PON system recommended by ITU-T G.983. The ATM-PON system shown in FIG. 1a or 1b is located on a tree structure route and has one OLT (Optical Line Termination) 10, which plays an important role in providing each subscriber associated with the access network with information. The OLT 10 has a tree topology and is connected to an ODN (Optical Distribution Network) 12. The ODN 12 distributes downstream data frames received from the OLT 10 as shown in FIG. 1a, or multiplexes upstream data frames, then transmits them to the OLT 10 as shown in FIG. 1b. The ODN 12 is connected to at least two ONUs (Optical Network Units) 14i (where, i=a, b and c; and a, b and c represent a natural number). The ONUs 14i are configured to receive the downstream data frames from the ODN 12 and transmit them to a plurality of users 16i (where, i=a, b and c; and a, b and c represent a natural number), as shown in FIG. 1a. The ONUs 14i use the output data from the users 16i as upstream data frames and transmit the upstream data frames to the ODN 12, as shown in FIG. 1b. Note that in FIGS. 1a~1b, the numerals 16i (i.e., 16a to 16c) denote users and may also represent an NT (Network Termination) or a variety of access network terminating units usable in a PON.

The conventional ATM-PON system shown in FIGS. 1a~1b performs upstream transmission or downstream transmission in the form of data frames each of which has a predetermined number of mutually changed ATM cells. Each ATM cell has a size of 53 bytes. In the tree-shaped PON structure shown in FIGS. 1a~1b, the OLT 10 properly inserts downstream cells to be distributed into each of the ONUs 14i into downstream frames. In case of upstream transmissions, the OLT 10 gains access to the data transmitted from the ONUs 14i according to a TDM (Time Division Multiplexing) protocol. In this case, the ODN 12 connected between the OLT 10 and the ONUs 14i functions as a passive component. The OLT 10 prevents data in the ODN 12 from colliding with one another by means of a virtual distance correction using a ranging algorithm. Further, in the case where the OLT 10 transmits downstream data to the ONUs 14i, an encryption key and an OAM (Operation, Administration and Maintenance) message are interchanged between the OLT 10 and the ONUs 14i in such a way that data confidentiality between the OLT 10 and the ONUs 14i can be ensured. To this end, the upstream/downstream frames have a dedicated ATM cell used for a message interchange at predetermined intervals or have a corresponding data field in a general ATM cell.

As described above, the ATM-PON system configures upstream/downstream frames based on a predetermined-sized ATM cell and performs a MAC protocol using a TDMA in the upstream transmission due to a point-to-multipoint tree structure. As a result, the band allocation algorithm of ONUs becomes complicated.

In the meantime, following the current trend of rapidly growing Internet technology, the demand for higher bandwidths is increasing. Therefore, many manufacturers have developed a PON system using a gigabit Ethernet instead of an ATM technique in order to accommodate the end-to-end transmission. The gigabit Ethernet has a relatively low production cost and wider bandwidth, whereas the ATM technique has a very high production cost and a limited bandwidth, and requires the Internet protocol packet segmentation.

A representative example known as a GE-PON system, using an Ethernet frame instead of the ATM in a PON structure of an access network, is made available by Alloptics Company. The GE-PON system manufactured by the Alloptics allocates a timeslot of a fixed size of 2 ms to each ONU. In this manner, the GE-PON system of Alloptics simplifies a band allocation algorithm because timeslots allocated to each ONU is fixed to a predetermined size. This GE-PON system, however, has drawbacks in that the bandwidths are wasted when there is no upstream/downstream data.

Thus, there is a need in the art for improved GE-PON systems that overcome this shortcoming of the prior art.

SUMMARY OF THE INVENTION

The present invention overcomes the above-described problems, and provides additional advantages, by providing an improved GE-PON system for performing a MAC protocol of a PON by employing gigabit Ethernet frame, and a method for controlling the same.

According to one aspect of the present invention, a MAC protocol method is provided for more effectively employing a gigabit Ethernet frame in a PON structure, and providing fields for ensuring a QoS (Quality of Service), OAM, and encryption.

According to embodiment of the present invention, a GE-PON system in a PON system is provided having an ODN, as of an optical splitter, that includes: an OLT for (1) transmitting a downstream window containing both a control frame having timeslot position and size information in association with at least two ONUs and Ethernet frames to the ODNs, for (2) analyzing contents of RAUs (Request Access Units) in an upstream window which is transmitted from the ONUs according to a TDMA method and received from the ODN, and for (3) determining timeslot position and size corresponding to each of the ONUs. There are a plurality of ONUs connected to the ODN for being allocated their own timeslot position and size in response to their own information contained in the control frame of the downstream window and for transmitting/receiving RAU frames having their own queue information and Ethernet frames to/from the allocated timeslots.

In a preferred embodiment, the Ethernet frame has a gigabit Ethernet frame, and the downstream window and the upstream window have a size of 2 ms, respectively.

In another preferred embodiment, the control frame of the downstream window includes permit information for determining ID (Identification) and timeslot position/size in association with a plurality of ONUs connected to the ODN.

In yet another preferred embodiment, the downstream window includes a plurality of OAM frames inserted at regular intervals. The plurality of OAM frames contains OAM-related information and ranging-control information in association with the ONUs connected the ODN. In this manner, in the case where the OAM frames are divided into many sections and then inserted, and all ONUs are grouped into a predetermined number of groups to allow the ONUs to share one OAM frame, operation time delay can be minimized.

BRIEF DESCRIPTION OF THE DRAWINGS

The advantages and features of the present invention will be more clearly understood from the following detailed description taken in conjunction with the accompanying drawings, in which:

FIG. 3 is a view illustrating a gigabit Ethernet frame structure in accordance with the present invention;

DETAILED DESCRIPTION OF THE PREFERRED EMBODIMENTS

Figure 1A:
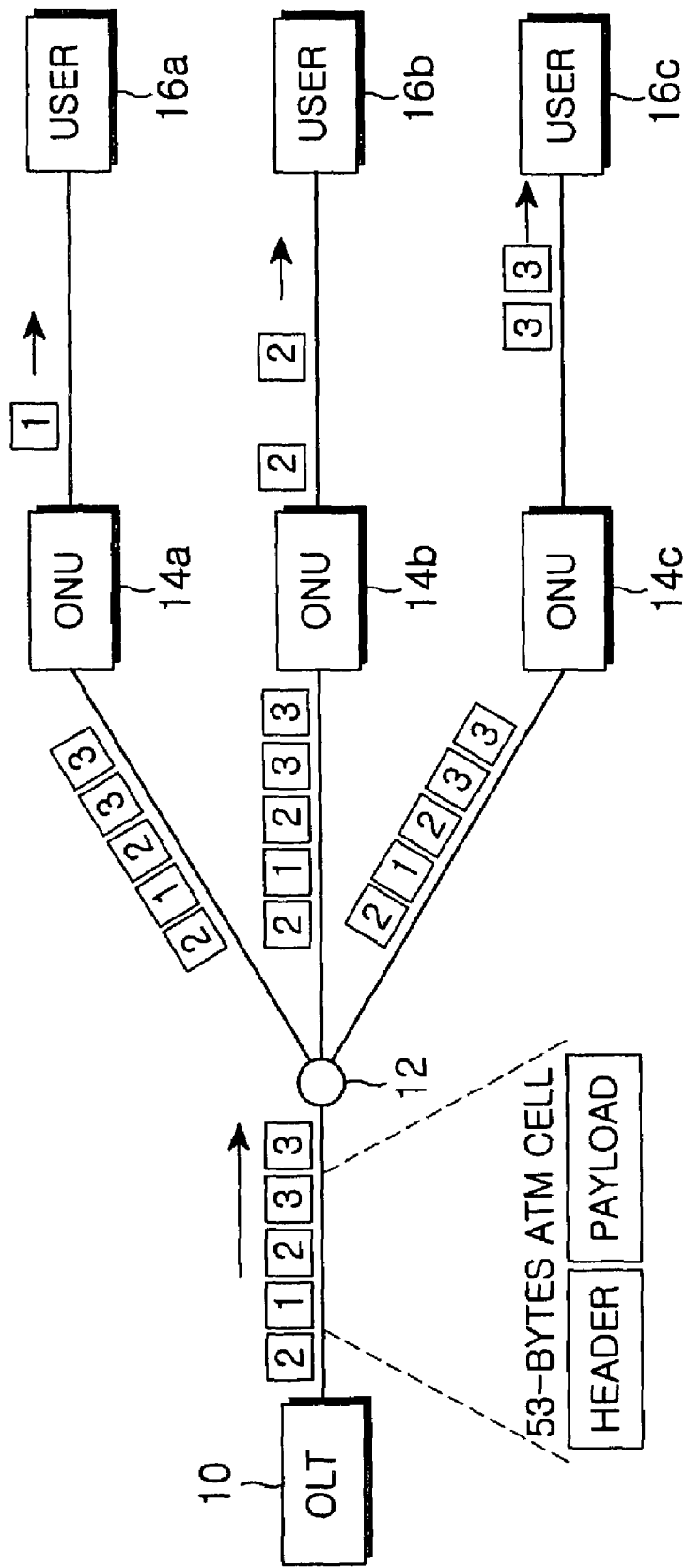
FIGS. 1a and 1b illustrate block diagrams of an ATM-PON system adapted to an ITU-T Recommendation G.983.

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention rather unclear.

Figure 1B:
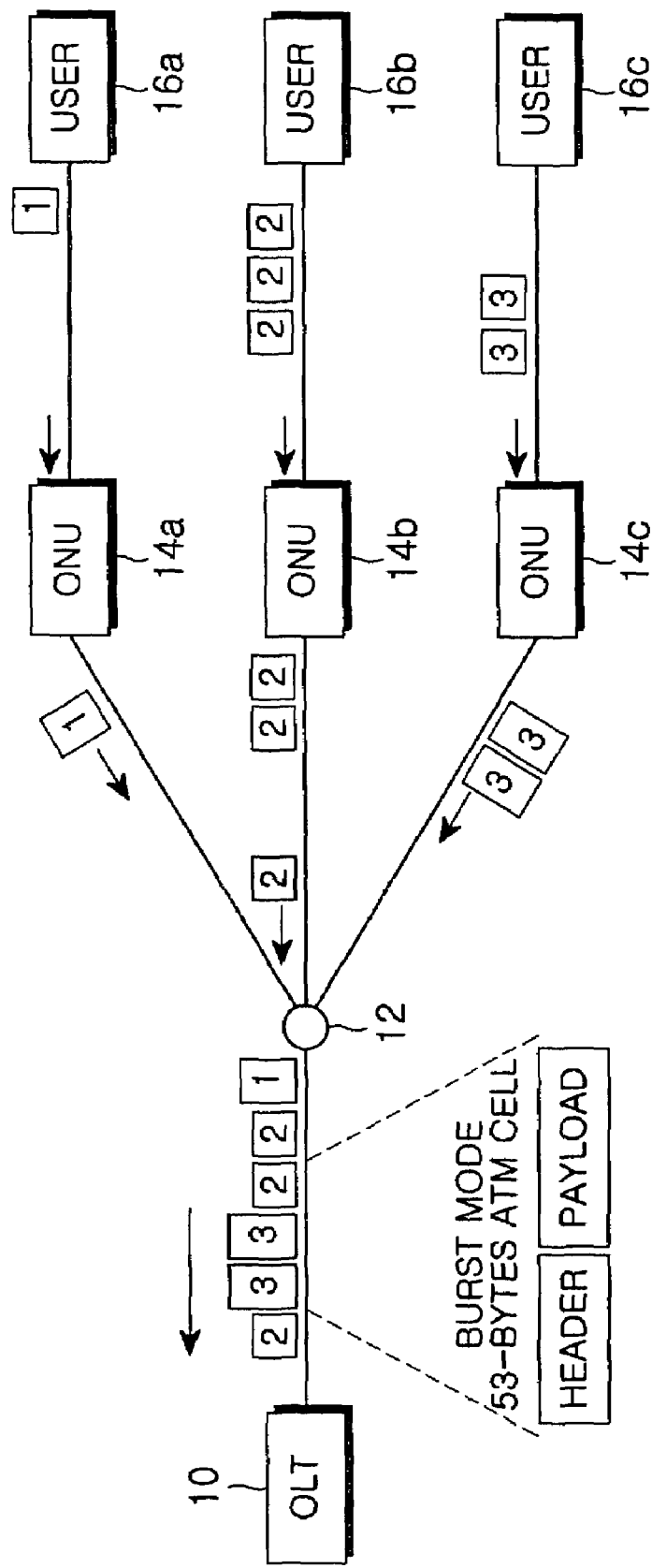
Figure 2A:
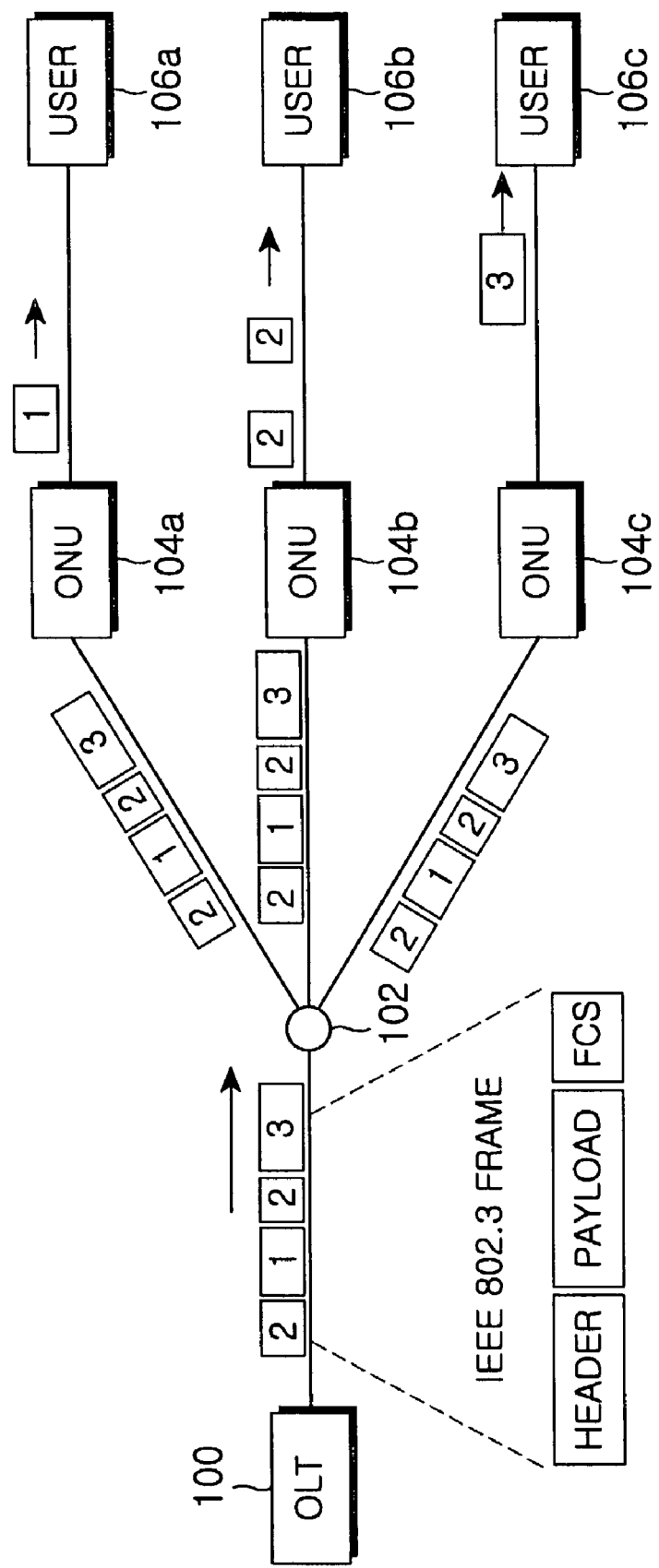
FIGS. 2a and 2b illustrate block diagrams of a GE-PON system in accordance with a preferred embodiment of the present invention.
Figure 2B:
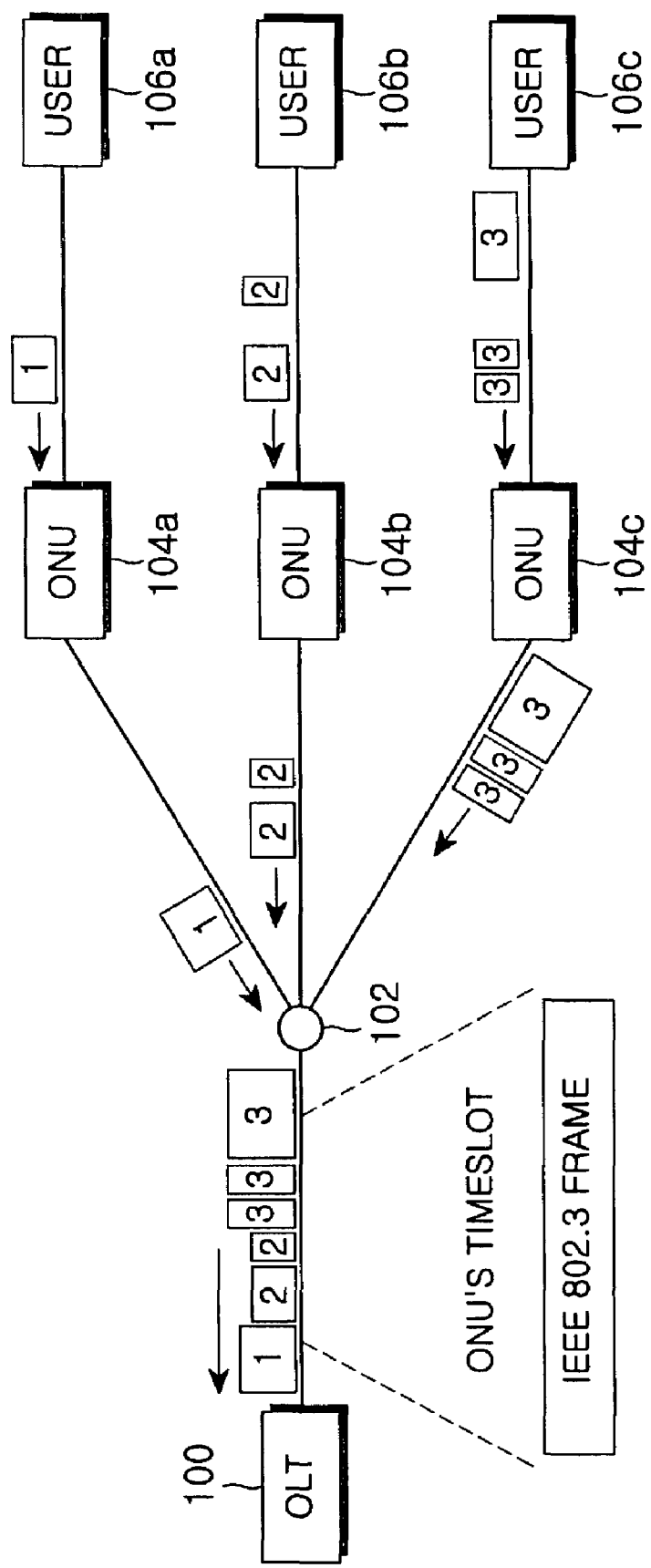

FIGS. 2a and 2b illustrate block diagrams of a GE-PON system in accordance with a preferred embodiment of the present invention. With reference to FIGS. 2a and 2b, an OLT 100, an ODN 102 made of an optical splitter being a passive component, a plurality of ONUs 104i (where, i=a, b and c; and a, b and c represent a natural number), and a connection structure among them are similar to corresponding elements shown in FIGS. 1a and 1b. The GE-PON system shown in FIG. 2a or 2b comprises one OLT functioning as a toll center, a plurality of users 106i (where, i=a, b and c; and a, b and c represent a natural number), and a plurality of ONUs 104i. It should be understood that the number of ONUs may be determined in consideration of a proper band allocation and a predicted optical power budget. If necessary, the ONUs 104i may be installed in a distributor box of a building or apartment block, or in an entrance of a residential area in such a way that they provide a variety of services such as an ADSL. The OLT 100 receives data from a backbone network (not shown), distributes the data into each ONU 104i through the ODN 102, or gains access to the data from the ONUs 104i according to a TDM method. For this purpose, the OLT 100 perform a switching function on MAC address of at least layer 2, and the ONUs 104i should be designed to perform an IP (Internet Protocol) switch/router function of layers 2 and 3.

Various functions and operations of the GE-PON system shown in FIG. 2a or 2b are as follows. One function of the GE-PON system is to maintain a band allocation of each of the ONUs 104i at a predetermined level in order to ensure a QoS of upstream/downstream data in a PON structure. Another function of the GE-PON system is to provide a MAC structure for performing a variety of additional functions such as encryption, an GAM function, and a ranging function. The encryption prevents a neighbor GNU 104j (where, j =a, b, and c; a, b, and c=natural number; and i≠j) from reading a broadcasting downstream data of a predetermined ONU 104i adjacent to the neighbor ONU 104j. Upon receiving a physical error in communication, the OAM function allows the physical error to be interchanged with the OLT 100 and the ONUs 104i. The ranging function constantly determines/maintains a virtual distance between the OLT 100 and the ONUs 104i to prevent data collision among the ODNs 1042 in case of upstream transmission, because the virtual distance between the OLT 100 and each ONU 104i may be variable after data passes through the ODN 102. A format for binding the Ethernet frame in a predetermined window form is needed to provide such a MAC structure using an Ethernet frame, and a MAC protocol structure according to this format will hereinafter be described in detail in the following.

FIG. 3 is a view illustrating a standardization gigabit Ethernet frame structure in accordance with the present invention. Referring to FIG. 3, a gigabit Ethernet frame includes a preamble of 7 bytes used for frame synchronization or physical stabilization by functioning as a specific bit stream preceding a frame start section, a SFD (Start Frame Delimiter) of 1 byte for indicating the frame start section by functioning as a specific format bit stream, a target hardware address and source hardware address each having 6 bytes, an LDF/TYP length of Data Field) of 2 bytes indicating a length of data field, a data field (denoted as LLC DATA) variable within a range from 0 to 1500 bytes, a padding field (PAD) used when data size of the data field is smaller than minimum frame size, and a CRC (Cyclic Redundancy Check) field of 4 bytes. The above gigabit Ethernet frame has been described in detail in IEEE 802.3z.

Figure 4:
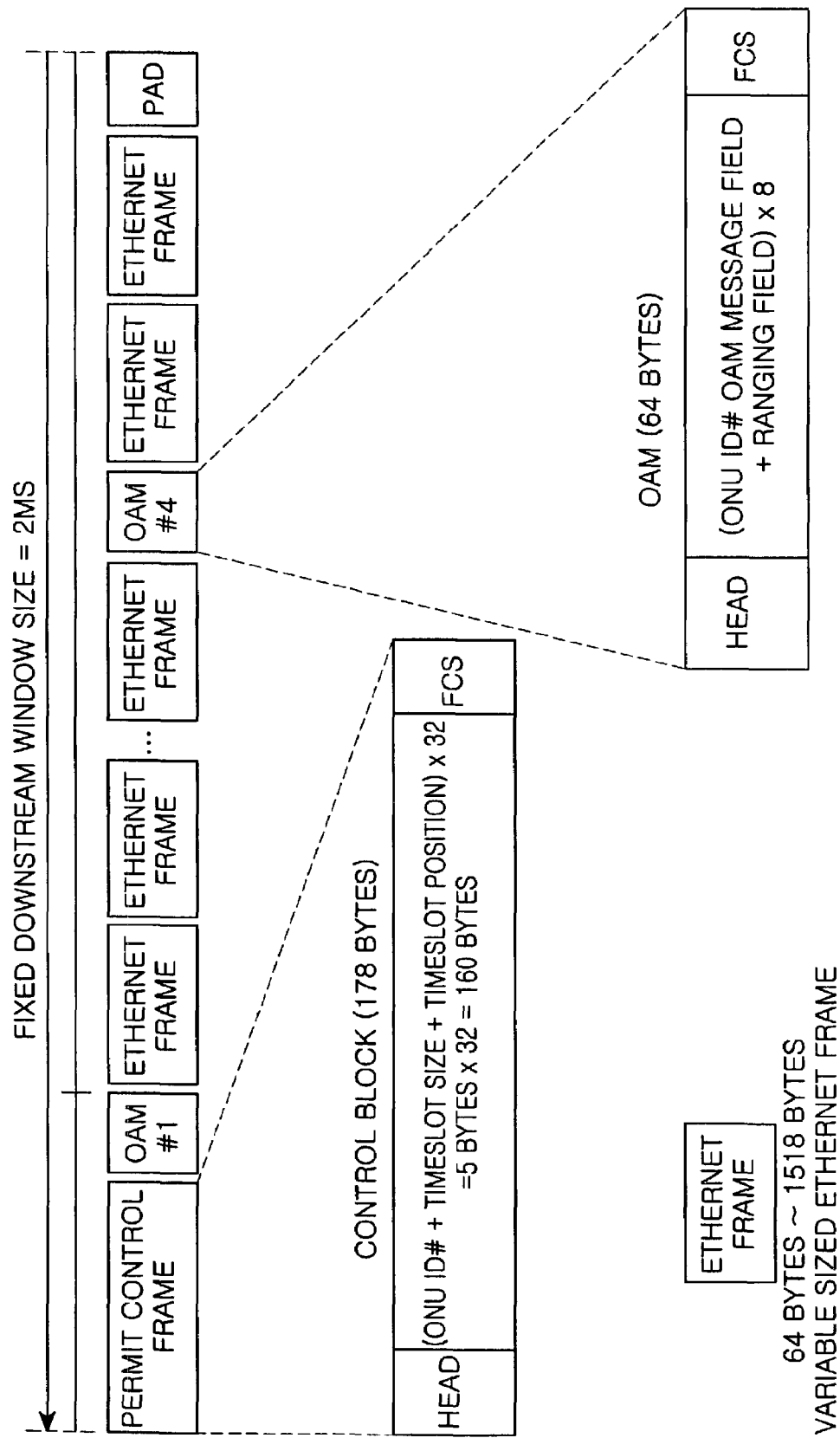
FIG. 4 is a view illustrating downstream window format in a GE-PON system in accordance with a preferred embodiment of the present invention.

FIG. 4 is a view illustrating the downstream window format transmitted from the OLT 100 to the ONUs 104i in the GE-PON system in accordance with a preferred embodiment of the present invention. Referring to FIG. 4, a length of the downstream window transmitted from the OLT 100 is fixed to 2 ms. The reason for the downstream window of 2 ms composed of variable gigabit Ethernet frames is that the shorter the downstream window length, the higher the occupied ratio of overhead as compared to the downstream window length. In contrast, the longer the downstream window length, the longer the access interval of each ONU 104i, thereby making it impossible to perform QoS and OAM functions. Accordingly, the downstream window of 2 ms is called a trade-off length.

A permit control frame is inserted in the downstream window, as shown in FIG. 4, so that a timeslot for upstream TDMA transmission from each ONU 104i and the size of the timeslot are allocated to the permit control frame. A total size of the timeslot allocated to each ONU 104i is variably allocated in octet units due to an Ethernet frame having a variable length. In the case where traffic loads required to the ONU 104i are different from one another, a fixed timeslot allocation results in a waste of bands so that using the above variable timeslot allocation provides the most effective band management. Also, four OAM frames (depicted as OAM #1 through OAM #4 in FIG. 4) each including a minimum Ethernet frame (i.e., 64 bytes) is inserted in the downstream window at predetermined intervals. Each OAM frame includes an ONU ID for indicating the ONUs 104i, an encryption key for the data encryption, a play&plug function of the ONUs 104i, various kinds of alarm signals, and a message field for the ranging function.

Figure 5:
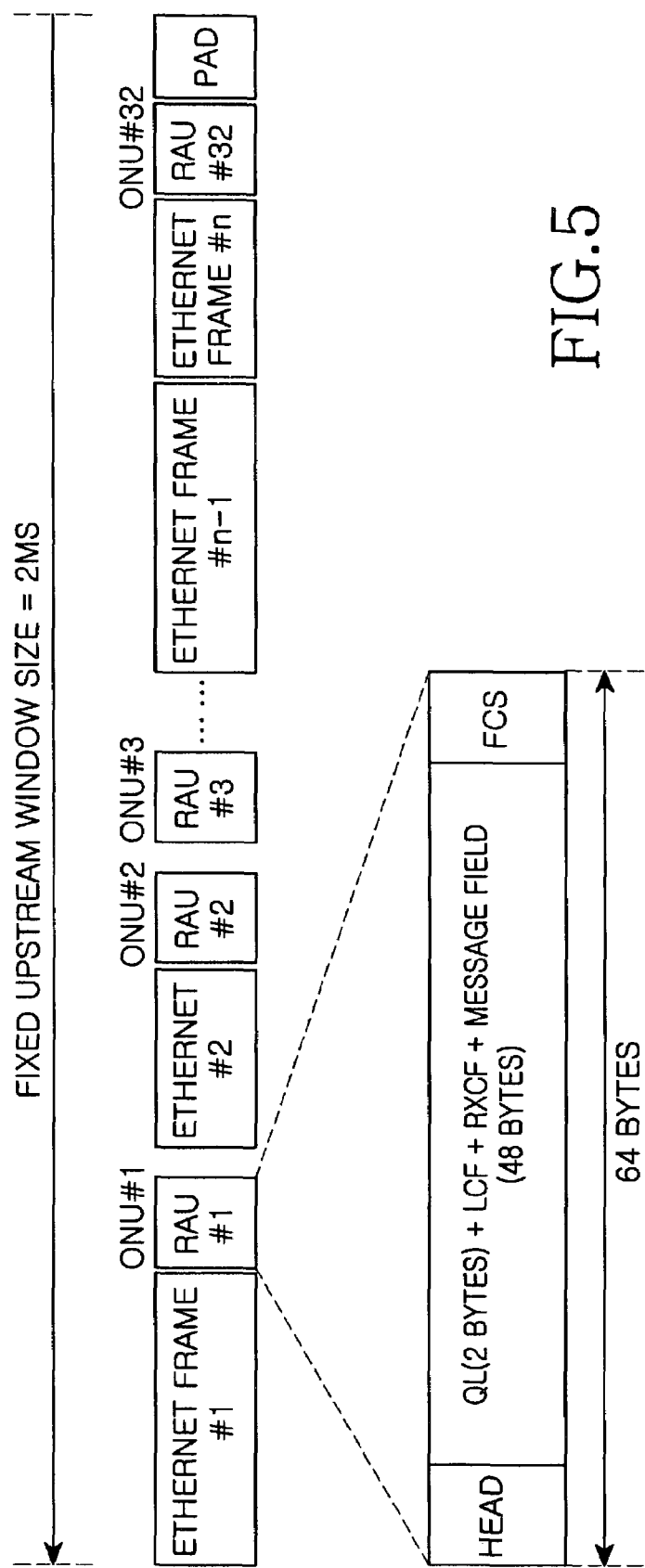
FIG. 5 is a view illustrating upstream window format in a GE-PON system in accordance with a preferred embodiment of the present invention.

FIG. 5 is a view illustrating upstream window format in the GE-PON system in accordance with a preferred embodiment of the present invention. In particular, FIG. 5 depicts an upstream window structure when data is transmitted from the ONUs 104i to timeslots allocated to Ethernet frames and RAUs (Request Access Units) according to a TDMA method. Referring to FIG. 5, each ONU 104i inserts RAUs composed of a minimum Ethernet frame (i.e., 64 bytes) in an upstream window, and then transmits them to the OLT 100. Each RAU includes a head, queue information QL of the ONU 104i, traffic information used for a band allocation, content for responding to downstream OAM frame, and a message field for inserting information needed for transmission.

Figure 6:
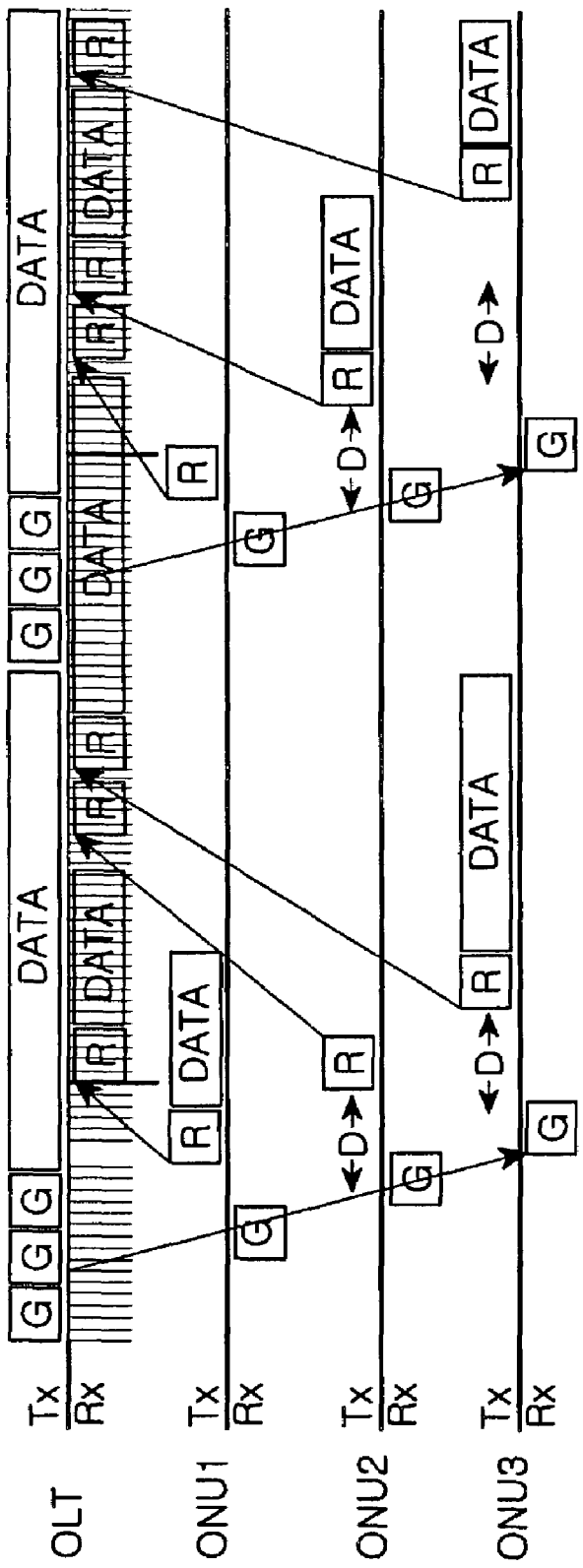
FIG. 6 is a view illustrating upstream/downstream channel transmission structures in accordance with a preferred embodiment of the present invention; and, FIG. 7 is view illustrating a band allocation by a mirror counter and a request counter in accordance with a preferred embodiment of the present invention.

FIG. 6 is a view illustrating upstream/downstream transmission structures in accordance with a preferred embodiment of the present invention. In more detail, FIG. 6 illustrates a data transmission/reception state between one OLT 100 and three ONUs 104i. Referring to FIG. 6, a reference character 'G' denotes a grant message including an ID, a timeslot, and timeslot size information in association with one ONU 104i. A reference character 'R' denotes a RAU including queue length information of the ONU 104i and traffic priority information. A reference character 'DATA' denotes user data composed of OAM frame and user data.

Figure 7:
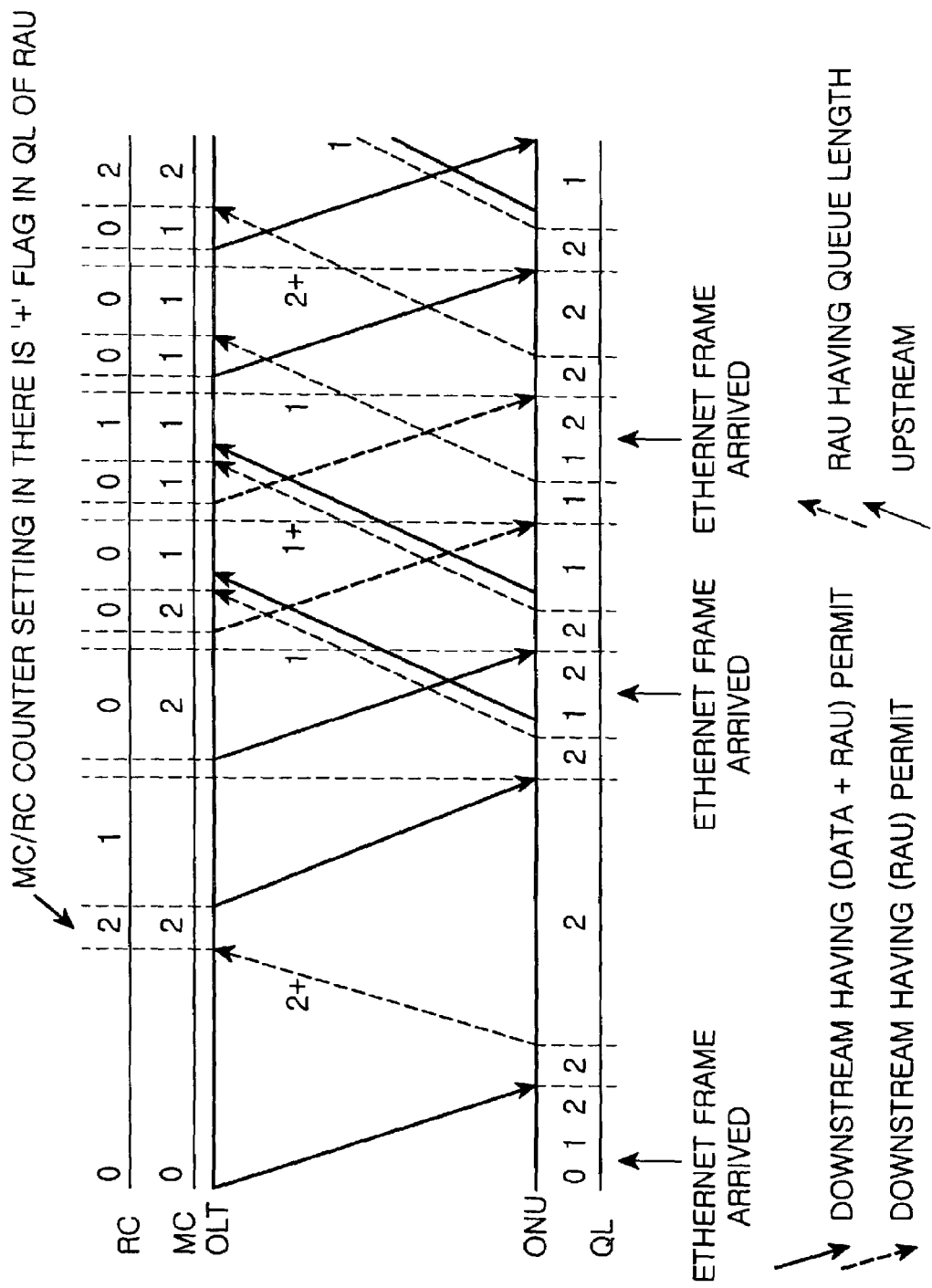

FIG. 7 is view illustrating band allocation by a mirror counter and a request counter in accordance with a preferred embodiment of the present invention. In more detail, FIG. 7 illustrates how to allocate timeslots and how to transmit data by adapting permit information over a downstream window broadcast from the OLT 100 and queue information of ONUs 104i over RAU, provided that each ONU 104i is capable of transmitting only one gigabit Ethernet frame in one cycle.

The required operations of the preferred embodiment of the present invention will hereinafter be described with reference to FIGS. 2a to 7.

In operation, the OLT 100, of the GE-PON system shown in FIG. 2a or 2b, broadcasts the downstream window of FIG. 4 to the ONUs 104i over ODN 102 every 2 ms. As shown in FIG. 4, a permit control frame is positioned in the start of the downstream window. The permit control frame includes a head, ID information of each of ONUs 104i (i.e., 32 ONUs) connected to the ODN 102 in a tree structure, and timeslot and timeslot-size information of each Ethernet frame to be permitted in upstream window transmission. The information needed to "permit" one ONU corresponds to a position and size of timeslots. This information requires 5 bytes. Therefore, to manage 32 ONUs, a size of the permit control frame can be calculated by "Header+(32×5 bytes)+Overhead." This leads to a permit control frame having a size of 178 bytes.

In the downstream window shown in FIG. 4, an OAM-related message (depicted as "OAM MESSAGE FIELD") and a ranging-related message (depicted as "RANGING FIELD") of an OLT 100 are loaded on an OAM frame (i.e., OAM #4) composed of a minimum Ethernet frame (e.g., 64 bytes). The OAM frame is transmitted to a plurality of the ONUs 104i. The OAM frame is divided into four OAM frame sections (hereinafter referred to as four OAM frames, depicted as OAM #1 through #4), and then the four OAM frames are inserted in the downstream window of 2 ms so as to prevent a time interval between OAM frames from becoming too long. In other words, a priority message in a current OAM frame of the OLT 100 is loaded on the next OAM frame adjacent to the current OAM frame in the four OAM frames, resulting in reduction in the length of time delay in case of message transmission. Information associated with each of the four OAM frames in the downstream window manage and perform a plug&play function and a ranging function in connection with eight ONUs 104i (e.g., 32 ONUs 104i in total). [THE PLUL&PLAY AND RANGING FUNCTION INFORMATION SHOULD BE ADDED TO FIG. 4]. The reason for inserting a PAD in the last section of the downstream window is in case a window length of 2 ms is insufficiently filled due to variability of the Ethernet frames, or to transmit a null traffic. The downstream window structure shown in FIG. 4 may include an IFG (Inter Frame Gap), a preamble, and as many as 160 gigabit Ethernet frames, each of 1518 bytes. In case of voice data, there is no problem in transmitting the voice data to the ONUs 104i, except for a time delay allowable by a maximum 2 ms caused by the fixed sizes of upstream/downstream windows.

Therefore, the downstream window transmission shown in FIG. 4 transmits gigabit Ethernet frame data to each of 32 ONUs 104i connected to the ODN 102 in a tree structure, simultaneously with permitting a timeslot position and a timeslot length regarding each of the ONUs 104i.

Reference will now be made to the upstream window structure is shown in FIG. 5. According to a permit control frame received from the OLT 100, upstream gigabit Ethernet frames of each ONU 104i are inserted in their own permitted timeslots. In the same manner as the downstream transmission, in the case where all upstream transmission permit information is in one ONU 104i, as many as 160 Ethernet frames each having 1518 bytes can be included in the upstream window structure.

In the case of a conventional upstream window, each ONU 14i connected to a conventional PON system is designed to be allocated timeslots from a permit control frame inside of the downstream window in such a way that at least one RAU frame is inserted in the upstream window even though there is no frame used for upstream transmission of the ONU 14i in the upstream window. The reason for making the above design of the ONU 14i is to prepare the next upstream transmission by continuously informing the OLT 10 of transmission queue information and OAM-related message of the ONU 14$i$, and to inform the OLT 10 of a state of the ONU 14$i$.

It is noted that in accordance with a preferred embodiment of the present invention, the GE-PON system shown in FIGS. 2$a$ or 2$b$ omits a permit procedure required for transmitting a queue state of ON-U 104$i$ so as to improve a waste of bands of an ATM-PON recommended by ITU-T G.983.1 by which the ATM-PON inquires/checks queue state information of ONU 104$i$ and then transmits permit information for upstream transmission.

By the aforementioned procedures, upstream/downstream maximum transmission capacity of one ONU 104$i$ is 960 Mbps, and a simultaneous upstream/downstream transmissible capacity of 32 ONUs 104$i$ is ensured by 30 Mbps. The ratio of overheads placed in the upstream/downstream window of 2 ms is about 4%. Provided that 16 ONUs 104$i$ are controlled, transmission capacity of about 60 Mbps can be permitted to the 16 ONUs 104$i$. Such operations will hereinafter be described with reference to FIG. 6.

Referring to FIG. 6, each ONU 104$i$ waits for its own timeslot according to an allocation content G of a permit control frame of the downstream window broadcast from the OLT 100. Each ONU 104$i$ then inserts a transmission message R and data in the upstream window.

Band allocation of timeslots is variable by a transmission/reception of downstream/upstream windows shown in FIGS. 4 and 5. This band allocation will hereinafter be described in detail with reference to FIG. 7.

FIG. 7 illustrates how to allocate timeslots and how to transmit data by adapting both permit information over the downstream window broadcast from the OLT 100 to the ONUs 104$i$, and queue information of ONUs 104$i$ over RAU. For this purpose, the OLT 100 includes a MC 107 (Mirror Counter) and RC 108 (Request Counter) (both are shown in FIGS. 2$a$ and 2$b$) concerning each ONU 104$i$. The allocation operation in which the OLT 100 allocates a timeslot size in upstream transmission of each ONU 104$i$ is unconditionally dependent on a MC and RC corresponding to each ONU 104$i$. The MC in the OLT 100 counts the number of gigabit Ethernet frames and their length, where the gigabit Ethernet frames are actually upstream-transmitted. The RC in the OLT 100 counts the number of permit request states recorded in RAU upstream-transmitted. As a result, upon receiving the output signals of the two counters MC and RC, the OLT 100 correctly performs a process for upstream transmission permit states concerning a permit request. A detailed description will hereinafter be described.

Referring to FIG. 7, a queue value QL in ONU 104$i$ increases whenever a gigabit Ethernet frame arrives at the ONU 104$i$, but decreases whenever the Ethernet frame is upstream-transmitted. In the case where the OLT 100 broadcasts downstream window having the above permit control frame under the condition that a transmission queue value QL in the ONU 104$i$ is set to "2", the ONU 104$i$ upstream-transmits an RAU frame to the OLT 100, where the RAU frame loads both transmission queue information "2+" and OAM information in an allocated timeslot position. In this case, MC and RC corresponding to the ONU 104$i$ in the OLT 100 are respectively set to "2" because a queue length and a permit request state included in the RAU frame of upstream transmission are set to "2+", respectively.

In the case where the OLT 100 permits the aforementioned upstream transmission through the Ethernet frame data (to be transmitted to a corresponding ONU 104$i$ via a downstream window) and the permit control frame, the value of RC is reduced to "1". In the case where upstream transmission is permitted once again in the next cycle, the value of RC is reduced to "0". In the case where the ONU 104$i$ upstream-transmits the gigabit Ethernet frame corresponding to a permitted timeslot length and the 104$i$'s transmission queue value QL to the 104$i$'s allocated timeslot position, a MC value within the OLT 100 and a queue length QL within the ONU 104$i$ are reduced.

By adapting the method shown in FIG. 7 in transmitting the Ethernet frame between the OLT 100 and the ONUs 104$i$, a MAC protocol in a PON system can be simplified. In other words, a typical system requires OLT's permission even when an ONU transmits a RAU, but the present invention remarkably reduces such permission step to improve system efficiency. The detailed description will be described in the following.

A plurality of data to be upstream-transmitted to an OLT 100 are accumulated in a queue memory of the ONUs 104$i$. It is necessary for the ONUs 104$i$ to inform the OLT 100 of the amount and urgency of data accumulated in the queue memory. So, the ONUs 104$i$ further have a RAU frame other than a general data frame, and load information in the queue memory to the OLT 100 through the RAU frame. Based on the information, the OLT 100 downstream-broadcasts a permit control frame having permit information to the ONUs 104$i$. The permit control frame indicates a priority for upstream data transmission and an allocation quantity (i.e., timeslot position and size (or band)).

In the case where requests in the ONUs 104$i$ are too numerous as compared with the actual upstream transmission data, the OLT 100 considers all of conditions. If more band allocation is needed for a corresponding ONU 104$i$ or band allocation condition is degraded to cause band occupancy of another ONU 104$i$, then upstream permission concerning traffic having a low priority may be abandoned in consideration of priority information of traffic. The band allocation for the ONUs 104$i$ will be greatly dependent upon an implementation plan of a future PON system such as an ISP, so that various particulars should be considered depending on the characteristics of access network.

The present invention in accordance with the above-described preferred embodiments provide a MAC structure for effectively transmitting a gigabit Ethernet transmission in a PON structure used for an access network in such a way that it provides a band higher than that of an ATM-PON. Also, the present invention divides an IP packet into ATM cells and reduces a quantity of overheads needed for re-assembling the IP packet in such a way that it makes an effective access network.

As apparent from the above description, the present invention includes a permit control frame, an OAM and a RAU, etc., which are downstream-broadcast, as they possess MAC frame attributes of the standardized gigabit Ethernet, in such a way that it is compatible with a typical gigabit Ethernet controller and some physical layer control chips that are produced currently on a commercial scale. In conclusion, the present invention reduces the production cost and time period that are required for developing a new version chip, and is adapted as a substitute for the expensive ATM device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A GE-PON (Gigabit Ethernet Passive Optical Network) system in a PON (Passive Optical Network) system having an ODN (Optical Distribution Network) as of an optical splitter, comprising:
   an OLT (Optical Line Termination) for transmitting a downstream window containing both a control frame having a variable timeslot position and variable size information in association with at least two ONUs (Optical Network Units) and Ethernet frames to the ODNs, analyzing contents of RAUs (Request Access Units) in an upstream window which is transmitted from the ONUs according to a TDMA (Time Division Multiplexing Access) method and received from the ODNs, and permitting timeslot position and size corresponding to each of the ONUs; and
   the at least two ONUs connected to the ODN, wherein the at least two ONUs are configured for having respective timeslot position and size variably allocated in response to respective information contained in the control frame of the downstream window, and transmitting/receiving RAU frames having respective queue information from each ONU's and Ethernet frames to/from the allocated timeslots;
   wherein the OLT provides permission in the permit control frame to transmit the RAU frames without receiving a request from the ONUs based on a queue level value (QL) in each ONU.

2. The GE-PON system as set forth in claim 1, wherein the downstream window includes at least two gigabit Ethernet frames.

3. The GE-PON system as set forth in claim 2, wherein the control frame of the downstream window includes permit information for determining ID (identification) and timeslot position/size in association with the ONUs connected to the ODN.

4. The GE-PON system as set forth in claim 3, wherein the downstream window includes a plurality of OAM (Operation, Administration and Maintenance) frames inserted at regular intervals, the plurality of OAM frames containing OAM-related information and ranging-control information in association with the ONUs connected the ODN.

5. The GE-PON system as set forth in claim 3, wherein the control, frame of the downstream window includes both timeslot size concerning each ONU and timeslot position information in the upstream window, and is then inserted in such a way that it permits upstream transmission concerning 32 ONUs.

6. The GE-PON system as set forth in claim 3, wherein the downstream window includes at least four OAM frames inserted at predetermined intervals, and where all the ONUs are grouped into a predetermined number of groups so that the ONUs can share one OAM frame, where each OAM frame includes OAM-related information and ranging information.

7. The GE-PON system as set forth in claim 2, wherein the RAU frames in the upstream window are composed of a minimum gigabit Ethernet frame, and each ONU inserts RAUs in the upstream window by a permit control frame in the downstream window without requesting permission from the OLT to transmit the RAUs.

8. A GE-PON (Gigabit Ethernet Passive Optical Network) system in a PON (Passive Optical Network) system having an ODN (Optical Distribution Network) as of an optical splitter, comprising:
   an OLT (Optical Line Termination) for transmitting a downstream window containing both a control frame having a variable timeslot position and variable size information in association with at least two ONUs (Optical Network Units) and Ethernet frames to the ODNs, analyzing contents of RAUs (Request Access Units) in an upstream window which is transmitted from the ONUs according to a TDMA (Time Division Multiplexing Access) method and received from the ODNs, and permitting timeslot position and size corresponding to each of the ONUs; and
   the at least two ONUs connected to the ODN, wherein the at least two ONUs are configured for having respective timeslot position and size variably allocated in response to respective information contained in the control frame of the downstream window, and transmitting/receiving RAU frames having respective queue information from each ONU's and Ethernet frames to/from the allocated timeslots,
   wherein the OLT includes:
   a minor counter for counting a number of gigabit Ethernet frames and size that are upstream-transmitted in response to each of the plurality of ONUs; and
   a request counter for counting Ethernet frame states of an ONU transmission queue transmitted via an upstream-transmitted RAU frame,
   wherein timeslot position and timeslot size in association with each of the ONUs are allocated to a mirror counter value and a request counter value corresponding to the respective ONU.

9. A method for controlling Media Access Control (MAC) in a GE-PON system including an OLT functioning as a toll center, at least one ONU, and an ODN connected between the OLT and the ONUs, comprising the steps of:
   a) broadcasting a downstream window by the OLT, the downstream window including a permit control frame for loading information into variable timeslot position and variable size of Ethernet frames concerning a plurality of ONUs to be transmitted in an upstream window, and a plurality of gigabit Ethernet frames to be broadcast to the plurality of ONUs; and
   b) allocating timeslot position and size in the upstream window to the ONUs by analyzing information of the permit control frame of the broadcasting downstream window, and enabling the plurality of ONUs to TDMA-transmit RAU frames having the plurality of ONU's own respective transmission queue state to the timeslot position inside of the upstream window according to the allocated timeslot size;
   wherein the OLT provides permission in the permit control frame to transmit the RAU frames without receiving a request from the ONUs based on a queue level value (QL) in each ONU, so that each ONU is not required to obtain permission from the OLT prior to transmitting the RAU frames.

10. The method as set forth in claim 9, wherein the permit control frame of the downstream window includes both variable timeslot size concerning each ONU's upstream transmission and variable timeslot position information inside of the upstream window, and is then inserted in the downstream window.

11. The method as set forth in claim 9, wherein the downstream window includes at least four OAM frames inserted at predetermined intervals, where all ONUs are grouped into a predetermined number of groups, and the ONUs are enabled to share one OAM frame, where each OAM frame includes information for ciphering among the ONUs, OAM information for operating/administering/maintaining the ONUs, and the ranging information.

12. The method as set forth in claim 9, wherein the RAU frames upstream-transmitted from each of the ONUs are composed of minimum gigabit Ethernet frames, and are indispensably inserted in the upstream window and ten transmitted.

* * * * *